US011002674B2

(12) United States Patent
Bjorøy

(10) Patent No.: US 11,002,674 B2
(45) Date of Patent: May 11, 2021

(54) GAS MONITOR

(71) Applicant: NEO Monitors AS, Skedsmokorset (NO)

(72) Inventor: Ove Bjorøy, Fjellhamar (NO)

(73) Assignee: NEO Monitors AS, Skedsmokorset (NO)

( * ) Notice: Subject to any disclaimer, the term of this patent is extended or adjusted under 35 U.S.C. 154(b) by 0 days.

(21) Appl. No.: 16/467,951

(22) PCT Filed: Dec. 12, 2017

(86) PCT No.: PCT/NO2017/050320
§ 371 (c)(1),
(2) Date: Jun. 7, 2019

(87) PCT Pub. No.: WO2018/111113
PCT Pub. Date: Jun. 21, 2018

(65) Prior Publication Data
US 2020/0088632 A1  Mar. 19, 2020

(30) Foreign Application Priority Data
Dec. 12, 2016 (NO) .................................. 20161967

(51) Int. Cl.
*G01N 21/39* (2006.01)
*G01N 21/25* (2006.01)
*G01N 21/17* (2006.01)

(52) U.S. Cl.
CPC ........... *G01N 21/39* (2013.01); *G01N 21/255* (2013.01); *G01N 2021/1793* (2013.01)

(58) Field of Classification Search
CPC ................. G01N 21/39; G01N 21/255; G01N 2021/1793
See application file for complete search history.

(56) References Cited

U.S. PATENT DOCUMENTS 4,794,258 A    12/1988  Fetzer et al.
5,255,073 A *  10/1993  Wallin ............... G01N 21/3504
                                                         250/573
(Continued)

FOREIGN PATENT DOCUMENTS

DE       284527 A5     11/1990
EP    2 058 671 A2      5/2009
(Continued)

OTHER PUBLICATIONS

English language Abstract of JP S58 213235 A (Dec. 12, 1983).
(Continued)

*Primary Examiner* — Dominic J Bologna
(74) *Attorney, Agent, or Firm* — Hershkovitz & Associates, PLLC; Abe Hershkovitz

(57) ABSTRACT

Gas monitor based on tuneable diode laser spectroscopy comprising at least one light source (1000) matched to at least one target gas (5000) and at least one light sensitive detector (3000), and a mirror arrangement (2000) made of a central mirror (2100) directing a light beam (4100) from the light source (1000) through the target gas (5000) to be analysed as well as a surrounding mirror (2300) around the central mirror (2100) directing the light transmitted through the gas (5000) onto at least one detector (3000). The gas monitor also comprising a control system controlling light sources (1000, 1100, 1200), digitising analogue signals as well as determining characteristics of the gas (5000). The gas monitor further comprising internal alignment means for fine alignment. The gas monitor can comprise two or more light sources (1000, 1100, 1200) targeting gases with absorption lines in two or more wavelength ranges. The gas monitor can in certain embodiments comprise one or more gas cells (2910, 2920) that can be inserted in an optical path to verify the performance of the instrument.

28 Claims, 10 Drawing Sheets

(56) References Cited

U.S. PATENT DOCUMENTS

| | | | |
|---|---|---|---|
| 5,767,976 | A | 6/1998 | Ankerhold et al. |
| 7,209,230 | B2 | 4/2007 | Odhner |
| 7,894,044 | B1 * | 2/2011 | Sullivan ................ G01S 7/4818 356/4.01 |
| 2003/0057383 | A1 | 3/2003 | Didomenico et al. |
| 2005/0162655 | A1 | 7/2005 | Nadler |
| 2007/0291271 | A1 * | 12/2007 | Wu ........................ G01N 21/39 356/437 |
| 2008/0079937 | A1 * | 4/2008 | Goodson, III ............ G01J 3/02 356/311 |
| 2012/0033220 | A1 * | 2/2012 | Kotidis ................... G01J 3/108 356/445 |
| 2015/0292947 | A1 | 10/2015 | Kotidis et al. |
| 2016/0209325 | A1 | 7/2016 | Kotidis et al. |

FOREIGN PATENT DOCUMENTS

| | | |
|---|---|---|
| JP | S58 213235 A | 12/1983 |
| JP | S58 213237 A | 12/1983 |
| WO | WO 2006/022550 A2 | 3/2006 |
| WO | WO 2016/200274 A1 | 12/2016 |

OTHER PUBLICATIONS

English language Abstract of JP S58 213237 A (Dec. 12, 1983).
International Search Report in International Application No. PCT/NO2017/050320, dated Mar. 16, 2018.
Search Report in corresponding Russian Application No. 2019121468/28(041924), dated Apr. 16, 2020.
Office Action in related Canadian Application No. 3,046,624, dated Jul. 3, 2020.

* cited by examiner

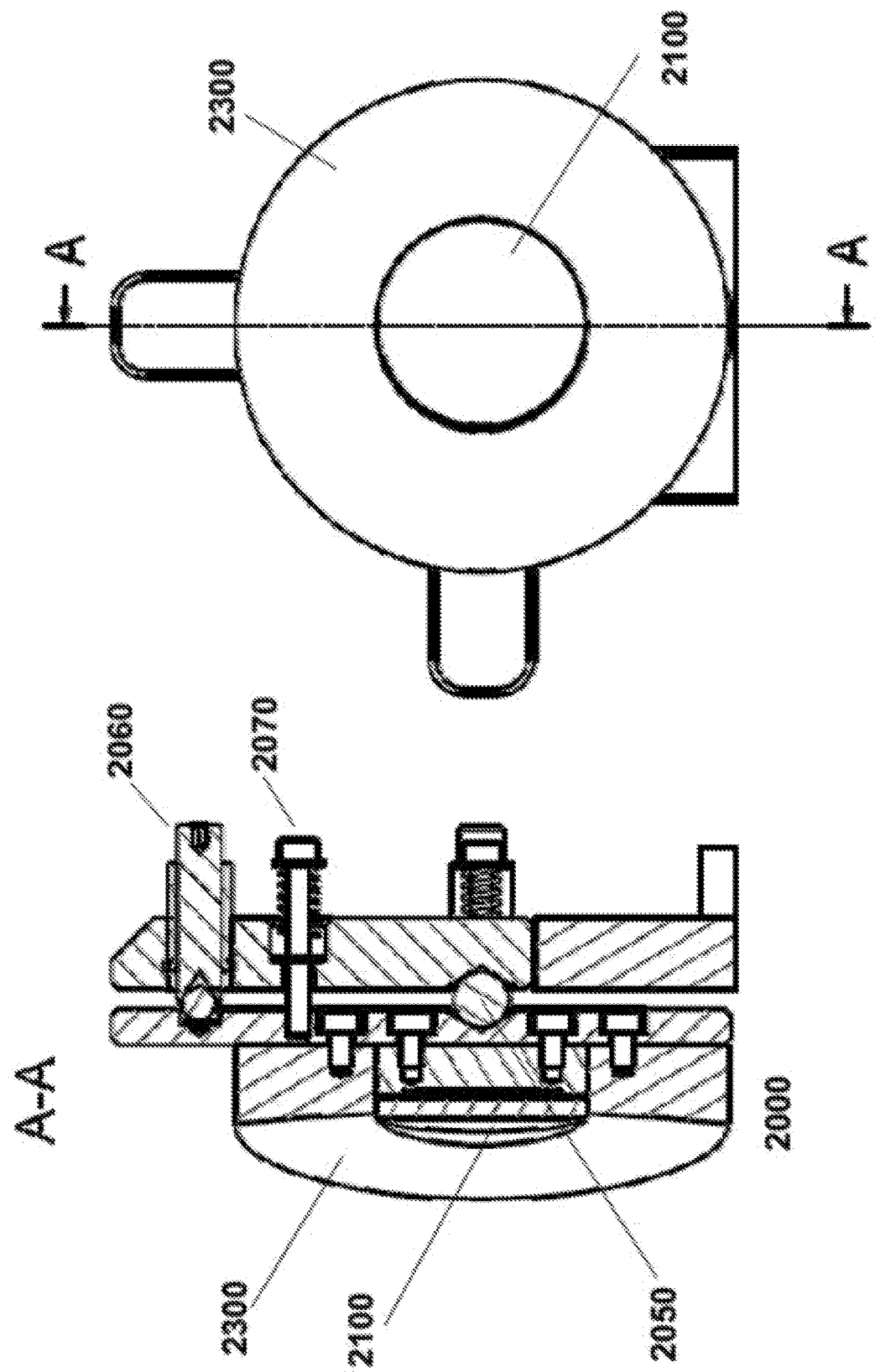

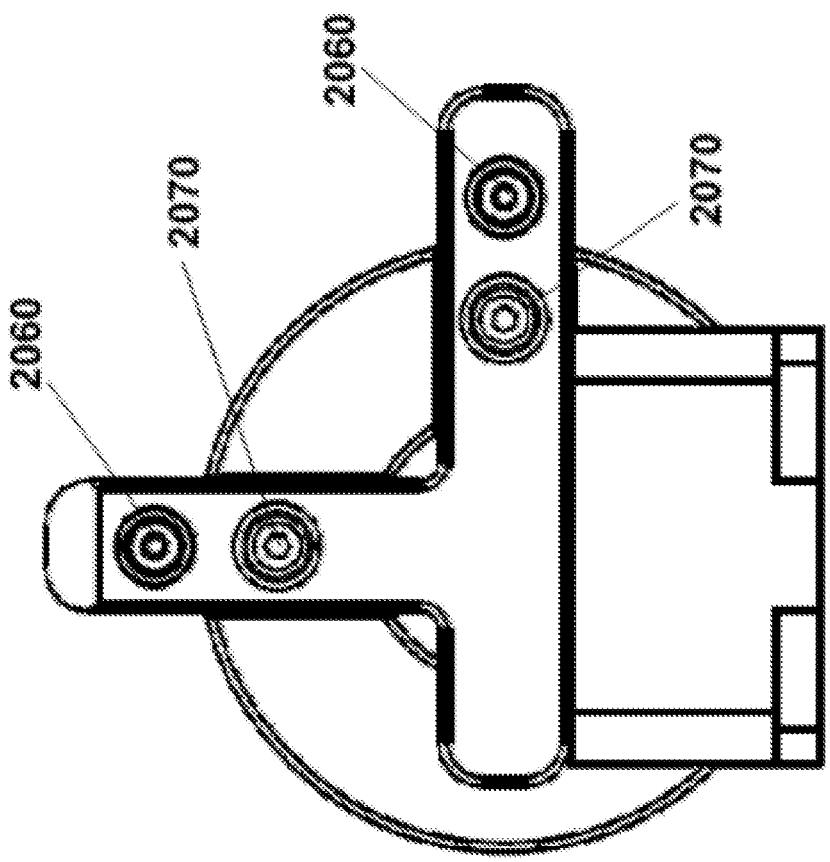
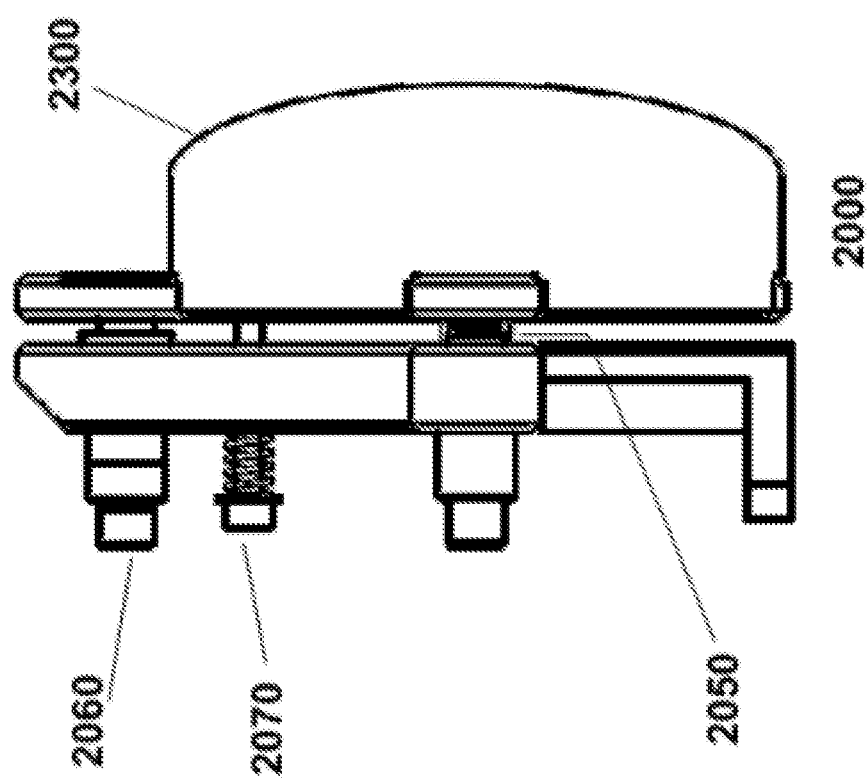
Fig. 6d
Fig. 6c

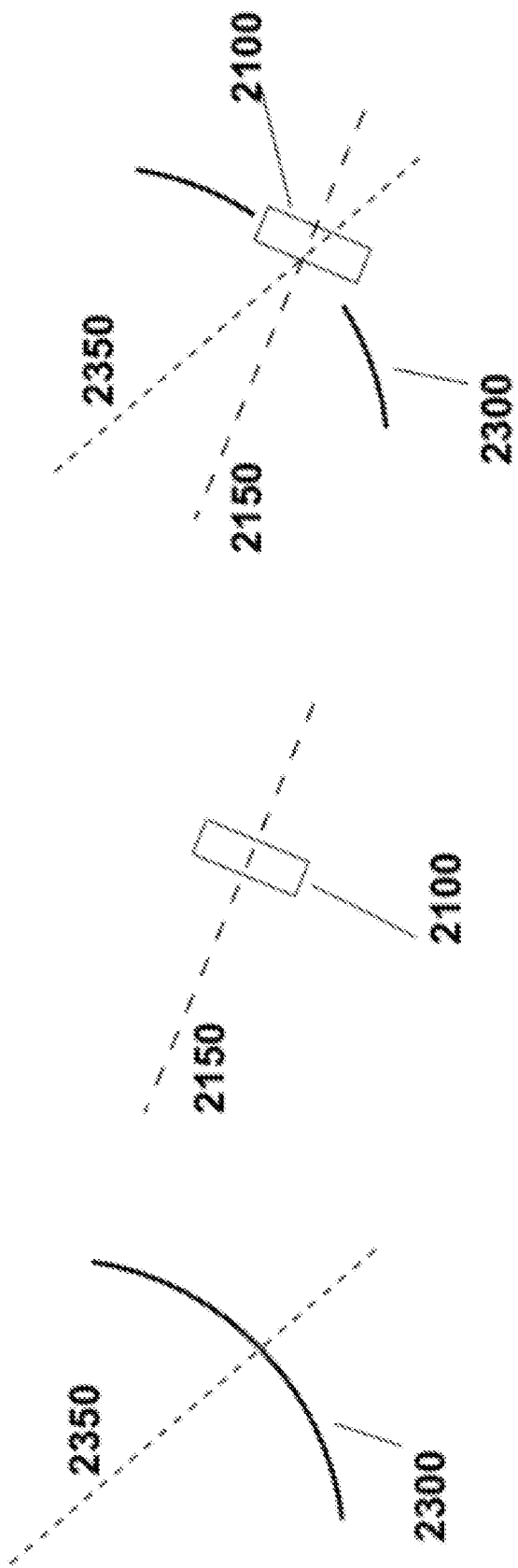

GAS MONITOR

BACKGROUND OF THE INVENTION

Technical Field

The invention relates in general to monitoring of gases by optical means. More specifically it relates to a gas monitor and method for determining characteristics of a target gas by directing light through a sample of said gas.

Background of the Invention

In process manufacturing, the energy industry, and other industrial settings there is a need to monitor the concentration, or pressure, of various gases, e.g., for process control and for safety reasons. Gas monitors based on tuneable diode lasers have gained market shares in recent years owing to providing a robust measurement technique less prone to interference from other gases, and capability to measure in-situ in high temperatures and under high pressures.

In a typical optical gas monitor, one single laser sensor can in general only measure one or two gases, possibly three in some cases, due to limited wavelength tuning range and lack of suitable absorption lines close to each other. This means that at least two lasers, and in practice at least two gas monitoring instruments, are needed to measure two or more gases, and this could lead to multiple sets of holes in a duct or stack. In addition, the optical path might in general be difficult to align, in particular in long open path applications. In a typical gas monitoring instrument for long open path applications, a Newtonian-type telescope might be used to direct the laser light towards a retro-reflector, and then used to collect the reflected light to a detector. Alignment of such a gas monitoring instrument requires the entire telescope to be accurately directed towards the retro-reflector, which in general is cumbersome and time-consuming. In addition, this arrangement has limited possibilities to cater for multiple lasers and detectors along the beam path, as well as suffers from limited options in the positioning of the optical components. The use of multiple lasers and detectors in a single instrument can be realized by the use of optical fibres and couplers, but such components normally introduce significant amounts of optical noise, which causes a degradation of the performance of the measurement.

Prior Art

WO 2006/022550 A2 describes a gas monitor based on a tuneable laser source that can be utilised with a retro-reflector to measure gas between the laser/detector and the retro-reflector.

DD 284527 A5 describes a device for infrared absorption measurement based on a hybrid Newtonian-Cassegrain telescope, where an aperture is present in the centre of the main mirror, and a beamsplitting mirror replaces the normal diagonal secondary mirror of a Newtonian telescope. This device allows aligning a laser beam coaxially with the detection path, but the device is still limited by the need to align the entire telescope, laser source, and detector towards the retro-reflector.

EP 2058671 A2 describes a device for laser range finding where a mirror assembly is used consisting of a large concave mirror for collecting the back-scattered light, and a small flat part of the mirror is centered on the large mirror, which is used to direct the laser beam coaxially with the large mirror. However, this disclosure does not allow the laser source and the detector to be positioned on separate optical axes, and the device is not intended for gas measurements.

US 2005/0162655 A1 describes a device where two concave mirrors are used, the first mirror to direct light from an optical fibre towards the retro-reflector, and the second mirror to collect the reflected light and direct it towards a second optical fibre connected to a detector. This disclosure requires the use of two concave mirrors, and the construction requires the entire device to be aligned towards the retro-reflector, including the light source fibre and the detector fibre. It also uses optical fibres, which can introduce optical noise.

Due to these limitations of the techniques described in the art, new improved apparatus and methods for gas monitoring would be advantageous.

DISCLOSURE OF THE INVENTION

Problems to be Solved by the Invention

Therefore, a main objective of the present invention is to provide a system and a method that overcomes the problems described above.

Accordingly, embodiments of the present disclosure preferably seek to mitigate, alleviate or eliminate one or more deficiencies, disadvantages or issues in the art, such as the above-identified, singly or in any combination by providing a device, system or method according to the appended patent claims for gas monitoring based on optical means.

The disclosure solves two common problems in gas monitoring based on tuneable diode laser spectroscopy. The first problem, i.e., alignment of the sensor, is solved by allowing alignment by moving only internal parts. The second problem, i.e., monitoring of more than one gas, is solved by utilising a plurality of tuneable diode lasers in one single instrument in one common optical path without using optical fibres and couplers that are a source of optical noise.

Means for Solving the Problems

The objective is achieved according to the invention by a gas monitor system for determining at least one characteristic of a target gas as defined in the preamble of claim 1, having the features of the characterising portion of claim 1 and a method for determining at least one characteristic of a target gas as defined in the preamble of claim 25, having the features of the characterising portion of claim 25.

SUMMARY OF THE INVENTION

A first object of the invention is to provide a gas monitor system for determining at least one characteristic of a target gas.

A further object of the invention is to provide a gas monitor system with an optimized number of components and relative positions of these.

One or more of these objects are being addressed by the present invention as defined by the accompanying claims.

According to a first aspect of the invention, there is provided a gas monitor system for determining at least one characteristic of a target gas, the gas monitor system comprising at least one light source, the light source being arranged for emitting light in a wavelength range where the target gas has at least one absorption line, the system further comprising a retro reflector and a control unit, the gas monitor system being arranged for directing the light through the target gas to the retro reflector returning the light to a receiving optics, the system further comprising a detector system with at least one light sensitive detector for detecting the light, the detector arranged for providing a signal to be received by the control unit, the control unit arranged for controlling the gas monitor system and calculating the at least one characteristic of the gas, characterized by the gas monitor system comprising a mirror arrangement, the mirror arrangement comprising a central mirror and a surrounding mirror each with a surface and an optical axis, where the central and the surrounding mirror are arranged with an offset angle between their optical axes, where the optical axes of the central and the surrounding mirror intersect at an intersection point in the proximity of the geometrical center of the surface of the central mirror, where the mirror arrangement can be tilted in any direction within a 3-dimensional solid angle around a pivot point, where the pivot point is located in the proximity of the intersection point, the central mirror being arranged for receiving light from the light source and directing light to the retro reflector, the retro reflector arranged for returning the light to the surrounding mirror, the surrounding mirror arranged for reflecting the light into the detector system.

The intersection point of the optical axes can preferably be located less than 10 mm from the geometrical center of the surface of the central mirror.

The pivot point can preferably be located less than 20 mm from the intersection point of the optical axes.

More preferably, the intersection point of the optical axes and the pivot point can be located at the geometrical center of the surface of the central mirror.

The gas monitor system may be arranged for forming beams, each beam having an axis, beam from the light source system comprising the light source to central mirror, beam from central mirror to retro reflector, beam from retro reflector to surrounding mirror and beam from surround mirror to detector system, and where the gas monitor system is arranged for the beams to and from the retro reflector to be substantially co-axial, and the axes of the beams to the central mirror from the light source system and from the surrounding mirror to the detector system to be non-coincident.

Twice the angle between the optical axis of the central mirror and the surrounding mirror substantially may correspond to the angle between the optical axis of the light source system and the detector system. The light source system and the detector system are positioned on different optical axes.

The central mirror and surrounding mirror may each comprise a surface for reflecting light, and the mirror arrangement is arranged such that the surface of the surrounding mirror surrounds the surface of the central mirror, where the surface of the surrounding mirror is larger than the surface of the central mirror. The surfaces of the central and surrounding mirror can further be arranged such that the intersections point of the optical axis are located at in the optical center of the central mirror. The central mirror typically may be one of the following forms: flat, parabolic, off-axis parabolic, and spherical, and the surrounding mirror: flat, parabolic, off-axis parabolic and spherical.

The detector system may be located outside the beams between the mirror arrangement and the retro reflector. The light source typically is a laser of one of the following types VCSEL lasers, DFB lasers, QCL and ICL lasers, Fabry-Perot lasers, as well as different array types of lasers.

The retro reflector may be one of the following types: cube corner, a reflective tape or any other device or surface capable of returning some light to the instrument.

The mirror arrangement may be is arranged for pointing the beam from the central mirror in a pointing direction mainly towards the retro reflector, and where the gas monitor system comprises alignment means for adjusting the pointing direction of the mirror arrangement.

The alignment means may be arranged for providing tilting of the mirror arrangement mainly around a pivot point. Further, the pivot point may be located in the proximity of the center of the surface of the central mirror, or behind said center in the proximity of the elongation of its optical axis.

The alignment means may comprise means for automatically aligning said mirror assembly towards the retro reflector by moving said mirror assembly while monitoring a signal, and finding an optimal signal.

The gas monitor system may comprise a visible light source arranged for sending a collimated beam of visible light substantially co-axially with the beam from the at least one light source to facilitate alignment of the system.

Further, the system may comprise a plurality of light sources operating at different wavelengths, each light source having a beam splitter for merging the light beams from the light sources to a common path; said beam splitters having spectral properties for the light from the light sources corresponding to each beam splitter to be essentially reflected, while light at wavelengths from other light sources is essentially transmitted.

The gas monitor system may comprise a plurality of light sensitive detectors and a plurality of beam splitters for separating the wavelengths from each light source to individual detectors, it may be arranged for time-multiplexing or a frequency-multiplexing to separate the wavelengths from each light source.

The system may be arranged to let excess light from the beam splitters pass through at least one gas cell for each of the light sources and then onto at least one additional light sensitive detector for each of said light sources; said at least one gas cell containing gas with absorption properties that suited to be used for self-calibration and to monitor the instrument integrity with regards to spectral operation points.

Further the retro reflector may comprise a beam blocking plate arranged substantially symmetrically around a center axis of the retro reflector for blocking light from being reflected by the retro reflector via the central mirror back to the light source, and the blocking plate may substantially be formed like a circular disc with a diameter optimized for a range of optical path length and beam divergence. Further, the blocking plate may be arranged in an angle tilted relative to the optical axis of the retro reflector.

Further the retro reflector can comprise a central part where substantially the reflective means have been removed to avoid laser light being reflected back via the central mirror to the light source.

Still further, a diffuser element is placed in the central part of the retroreflector where the reflective means have been removed, the diffuser element reducing optical noise and reflections from surfaces behind the retroreflector. The reflective surfaces of the central part comprising a reflective surface which can be sand blasted or etched for substantially removing the reflective surface and making the diffuser element.

A still further aspect of the invention is a method for determining at least one characteristic of a target gas, comprising the following steps:

emitting light in a range where the target gas has at least one absorption line in a beam from a light source;

reflecting the light by the central mirror through a sample of the target gas towards a retro reflector;

returning the light by the retro reflector towards a surrounding mirror surrounding the central mirror;

reflecting the light by the surrounding mirror towards a detector system;

detecting the light by at least one detector comprised by a detector system;

receiving a signal from the detector system and determining at least one characteristic of the gas by a control system.

The gas monitor typically is based on tuneable diode laser spectroscopy comprising at least one light source, where the light source typically is a tuneable laser matched to at least one target gas and at least one light sensitive detector, and optical means to form light beams and direct light beams through the target gas to be analysed as well as directing the light onto at least one detector. The gas monitor also comprising a control system controlling light sources, digitising analogue signals as well as determining characteristics of the gas. The gas monitor further comprising internal alignment means for fine alignment. The gas monitor can comprise two or more light sources targeting gases with absorption lines in two or more wavelength ranges. The gas monitor can in certain embodiments comprise one or more gas cells that can be inserted in an optical path to verify the performance of the instrument.

The disclosure comprises the combination of a mirror for the exiting laser beam, and a larger mirror for collecting reflected light. FIG. 1 depicts an example of a system where a moveable mirror assembly (2000) is used, comprising a concave mirror surface (2300), said concave surface having a hole, in which an essentially flat mirror is mounted (2100). The mirror assembly can be tilted in all directions using mechanics and motors or any other available actuators. The mirror assembly is designed so that when the laser (1000) emits light (4100) this light reaches the flat mirror in the mirror assembly, the light reflected (4200) from the flat mirror will reach the retro reflector (2200) and the light reflected (4300) from the retro reflector hits the concave mirror (2300), the concave mirror focuses the light (4400) that finally reaches the detector (3000). As long as the instrument is coarsely aligned and within the adjustable range the internal alignment means will be able to align the instrument.

In addition to providing internal alignment of the instrument, the current disclosure also enables multiple lasers to be included in the design following the same optical paths and utilizing the same alignment means, as illustrated in the example in FIG. 2, where an additional laser (1100) is added together with two beam splitters (2720)(2740) and a mirror (2600). This way the two laser beams are merged and following the same path. An additional detector (3100) is added and a beam splitter (2700) may also be added.

A central aspect of the invention is to be able to use a cube corner (2200) to return the laser beam and then be able to focus the returned light onto one or more detectors (3000, 3100) non-co-axial design with reference to a light source system where the light source typically may be a laser. To achieve this, a mirror assembly (2000) has been designed. The mirror assembly is comprising two mirrors, a first mirror (2100) in the central part and a second larger mirror (2300) surrounding the first mirror. These mirrors will be mounted so that there is an angle between them. This angle is to be selected so that it fits the geometry of the optical system i.e., the distance between the laser system and the detector system with reference to their distance to the mirror assembly. The detector system comprises a single light sensitive detector (3000) in an instrument comprising one laser. In an instrument comprising two lasers the detector system comprises two detectors (3000, 3100) and a beam splitter (2700). In an instrument comprising one laser and a flat surrounding mirror (2310) the detector system comprises a detector (3000) and a focusing lens (6000).

The central mirror (2100) will be flat if the laser beam divergence is suitable for use in the selected setup. The central mirror will be convex or concave respectively if one wants to reduce or increase the laser beam divergence. The larger, surrounding mirror can be flat (2310), spherical or parabolic (2300). In one first embodiment it is parabolic. The larger mirror (2300) will focus the beam onto the detector system (3000). In another second embodiment the larger surrounding mirror (2310) will be flat as shown in FIG. 5 a. This embodiment comprises a lens (6000) that focuses the light onto the detector (3000).

A system comprising two flat mirrors (2100, 2310) as described in FIGS. 5 a and 5 b is easier to understand with regards to angle between the laser beam or rays and the rays reaching the focusing lens (6000) and the detector (3000). There is a direct correspondence between the angle between the two mirrors (2100, 2310) and angle between the optical axis of the light source system comprising the light source (1000) and the detector system (6000, 3000).

To explain a central aspect of the invention it is assumed that the tilt of the mirror assembly (2000) has been adjusted to get maximum light intensity onto the detector so that we are in a scenario as shown in FIG. 5 a. If the retro reflector is moved or rotated, the complete instrument comprising the laser, mirror assembly, detector system etc. relatively to retro reflector the alignment will be lost and the light intensity onto the detector will be reduced. If we as an example take the setup shown in FIG. 5 a) and move the retro reflector somewhat up the light intensity onto the detector will be reduced significantly. The mirror assembly is then adjusted to achieve the maximum light intensity onto the detector. We will then have a situation as described in FIG. 5 b). In FIG. 5 b it can be seen that the retro reflector has been moved up and that the angle alpha of the mirror assembly has been reduced with an amount delta. However, the light is still focused onto the same spot on the detector. This is a central idea of this invention.

In a typical embodiment the flat surrounding mirror (2310) will be replaced by an off-axis parabolic mirror (2300). However, the same principles apply for the angle between the large mirror and the central small mirror and their correspondence with the angle between the optical axis of the light source system and the optical axis of the detector system. Using a parabolic mirror the focusing lens (6000) is not needed to focus light onto the detector. Systems using a parabolic mirror are shown in FIGS. 1, 2 and 3.

It is a requirement that the returned beam from the retro reflector has a larger diameter or cross section than the size of small central mirror so that there is sufficient light to be focused onto the detector system.

Ideally the mirror assembly move or tilt around a point at the surface in the centre of the small central mirror. This is possible to implement using a gimbal like mechanical design to retain the mirror assembly. However, it is easier to implement an opto-mechanical solution where the point of movement is put a certain distance behind the surface of the central mirror as shown in FIGS. 1, 2 and 3. Such a solution will give a somewhat smaller adjustment range.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

The above and further features of the invention are set forth with particularity in the appended claims and together with advantages thereof will become clearer from consideration of the following detailed description of an [exemplary] embodiment of the invention given with reference to the accompanying drawings.

The invention will be further described below in connection with exemplary embodiments which are schematically shown in the drawings, wherein:

FIG. 6 shows one possible implementation of the alignment system that can be used to align the gas monitor by changing the pointing direction of the mirror assembly (2000). FIG. 6 *a*) shows a cross section of the alignment mechanics. It is actually the cross section A-A of FIG. 6 *b*) which shows the mirror assembly from the mirror side. FIG. 6 *c*) shows the alignment system from one side. FIG. 6 *d*) shows the alignment system from the rear side.

FIG. 7*a* shows the surrounding mirror surface (2300) and its optical axis (2350) without a hole for the central mirror.

FIG. 7*b* shows the central typically flat mirror (2100) and its optical axis (2150).

FIG. 7*c* shows the surrounding mirror (2300) with its central hole where the central typically flat mirror (2100) is placed.

Figure 1:
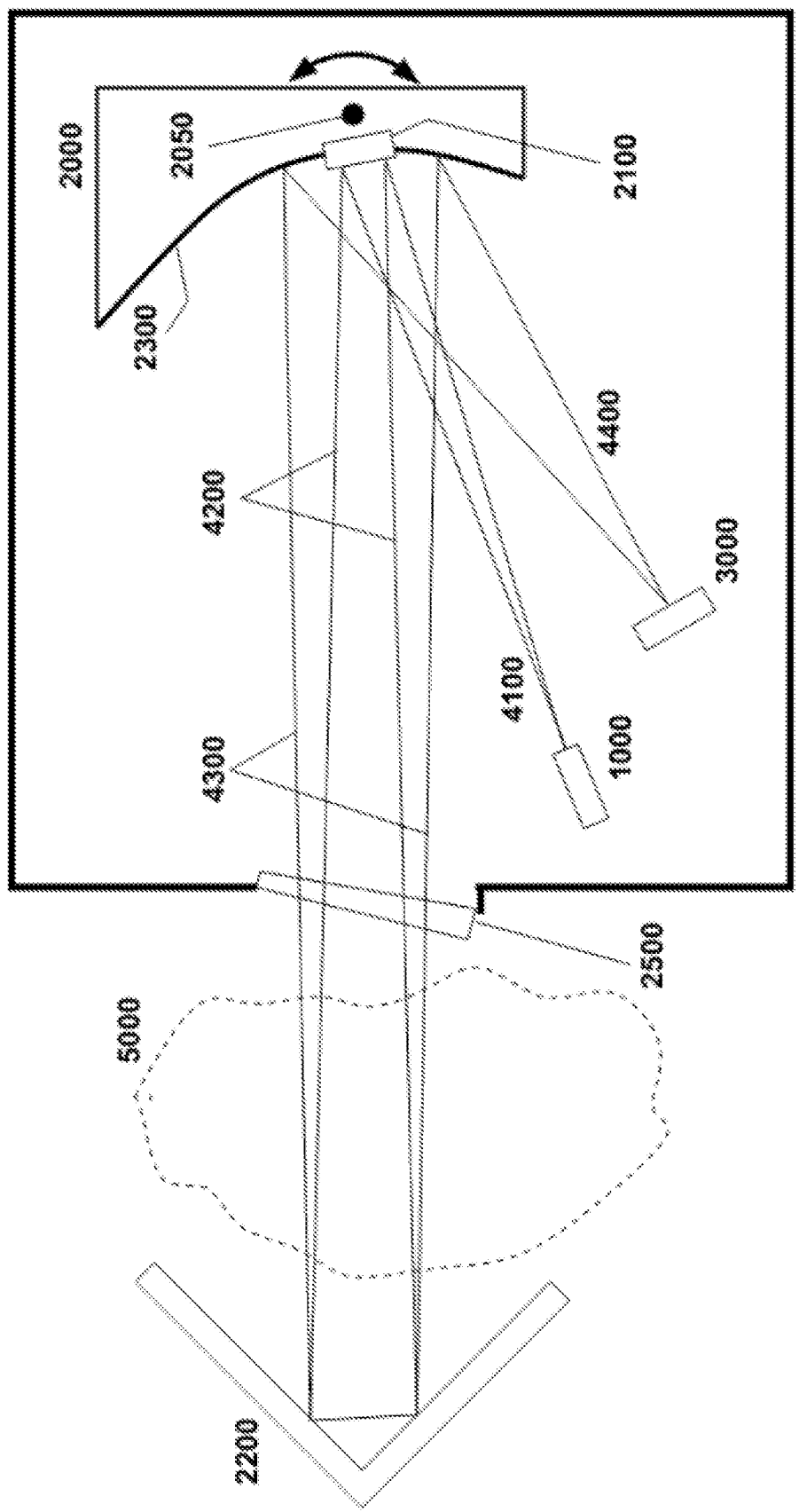
FIG. 1 is illustrating the basic alignment part of the current invention with a laser (1000), a mirror assembly (2000), an external retro reflector (2200) and a detector (3000)

Note that the figures are not to scale.

DESCRIPTION OF REFERENCE SIGNS

The following reference numbers and signs refer to the drawings:

| Reference number | Description |
|---|---|
| 1000 | Light source, typically a laser |
| 1100 | A second laser with a different wavelength than the first laser |

-continued

| Reference number | Description |
|---|---|
| 1200 | A laser for alignment, typically visible, possibly red |
| 2000 | Mirror parabolous assembly |
| 2050 | Point or axis of rotation mirror parabolous assembly |
| 2060 | Push-screw in alignment system |
| 2070 | Pull-screw in alignment system |
| 2100 | Flat mirror reflecting divergent beam from laser(s) |
| 2150 | Optical axis of surrounding mirror |
| 2200 | Retro reflector, cube corner |
| 2210 | shade or beam blocking plate |
| 2211 | shade or beam blocking plate somewhat larger |
| 2230 | Holder for retro reflector |
| 2240 | Central part of the retro reflector |
| 2250 | Diffuser element |
| 2300 | Parabolic surface focusing returned light onto detector(s) |
| 2310 | Flat mirror equivalent to parabolic mirror |
| 2350 | Optical axis of central mirror |
| 2500 | Window of apparatur, tilted and wedged |
| 2600 | Mirror for reflecting merged laser ligth to the flat mirror 2100 |
| 2700 | Beam splitter for splitting light from two lasers onto two detector |
| 2720 | Beam splitter for including a first laser |
| 2740 | Beam splitter for including a second laser |
| 2810 | A lens for focusing a reference signal from the first laser |
| 2820 | A lens for focusing a reference signal from the second laser |
| 2910 | A span or reference cell for check of the first laser |
| 2920 | A span or reference cell for check of the second laser |
| 3000 | Light sensitive detector |
| 3100 | A second detector for detecting light from the second laser wavelength |
| 3200 | A detector for check of the first laser |
| 3300 | A detector for check of the second laser |
| 4100 | Divergent beam from laser |
| 4200 | Beam from laser reflected by flat mirror |
| 4210 | Beam from laser reflected by flat mirror, angle changed 2 delta |
| 4300 | Beam reflected from cube corner on its way to parabolic mirror |
| 4310 | Beam reflected from cube corner on its way to flat parabolic equivalent, angle changed 2 delta |
| 4400 | Focused beam from parabolic mirror to detector |
| 4410 | Beam focused onto the first detector |
| 4420 | Beam focused onto the second detector |
| 4450 | Beam reflected from flat mirror parabolic equivalent to focusing lens |
| 4460 | focused beam on its way to the detector |
| 5000 | Target gas to be analysed |
| 6000 | Lens for focusing light onto detector |

DETAILED DESCRIPTION OF EMBODIMENTS

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The following disclosure focuses on examples of the present disclosure applicable to gas monitoring by optical means. For example, this is advantageous for long open path applications of gas monitoring. However, it will be appreciated that the description is not limited to this application but may be applied to many other systems where optical gas detection is performed.

In a first example, illustrated in FIG. 1, a gas monitoring system is shown with a moveable mirror assembly (2000) comprising a parabolic surface (2300), said parabolic surface having a hole, in which an essentially flat mirror (2100) is mounted. Said mirror assembly can be tilted in all directions using mechanics and motors or any other available actuators. Actuator control is done by electronic components which are controlled by a processing unit. Based on laser modulation and measurement of the detector signal the microprocessor can determine the optimal alignment for the instrument, tune for maximum "smoke" i.e., maximum signal.

The mirror assembly (2000) is designed so that when the laser (1000) emits light (4100) this light reaches the essentially flat mirror (2100) in the mirror assembly, the light reflected (4200) from said essentially flat mirror will reach the retro reflector (2200), and the light reflected (4300) from the retro reflector hits the parabolic mirror (2300), the parabolic mirror focuses the light (4400) that finally reaches the detector (3000). As long as the instrument is coarsely aligned and within the adjustable range, the internal alignment means will be able to align the instrument. In addition, the mirror assembly design assures that that laser light will follow the intended paths also when alignment away from the centre position is required.

Figure 2:
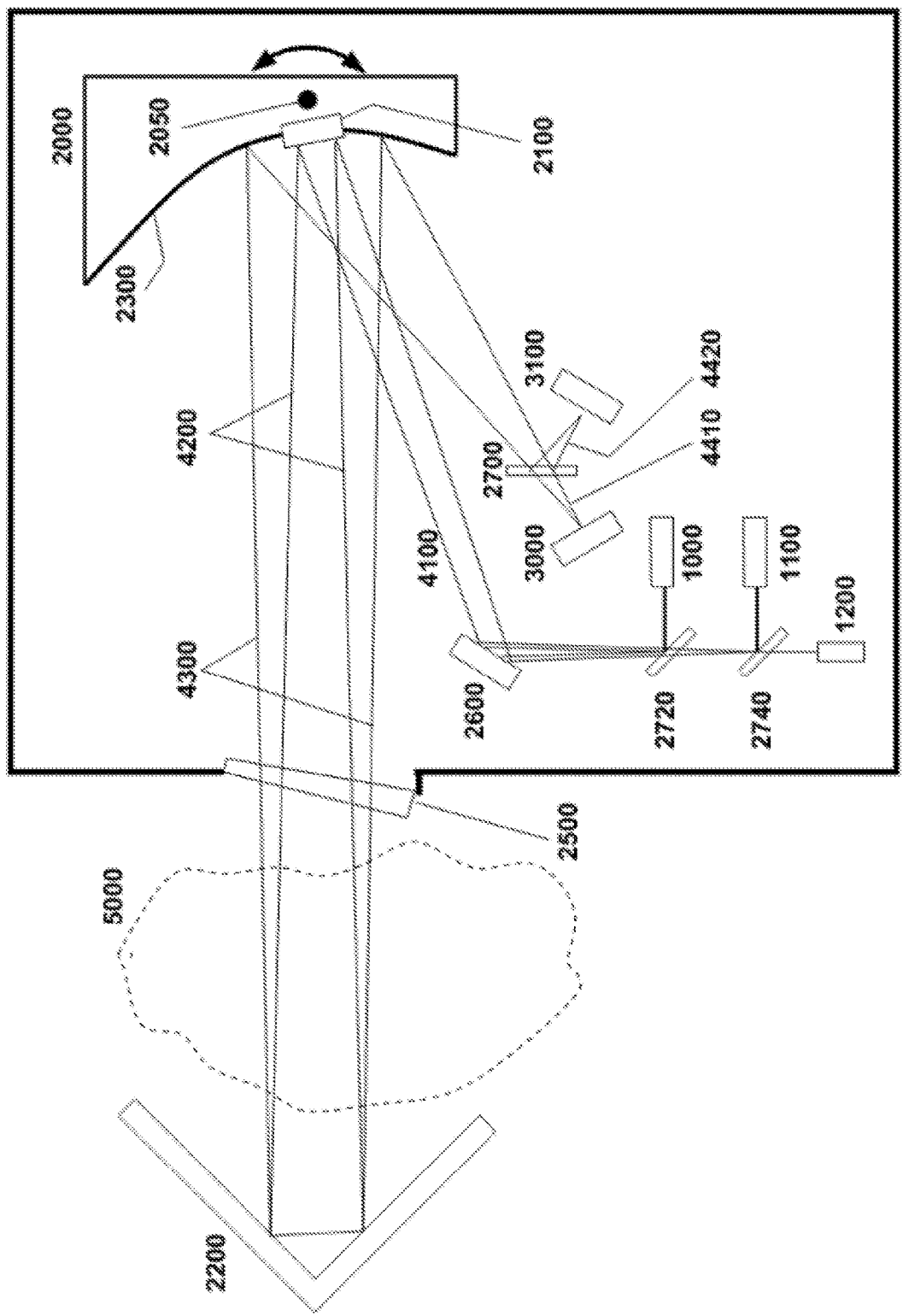
FIG. 2 is illustrating the invention when a second laser (1100) is introduced together with beam splitters (2720) (2740) as well as a mirror (2700) and a second detector (3100)

In another example, as illustrated in FIG. 2, the disclosure also enables multiple lasers to be included in the design, following the same optical paths and utilizing the same alignment means. An additional laser (1100) is added together with two beam splitters (2720)(2740) and a mirror (2600). This way the two laser beams are merged and follow the same path. An additional detector (3100) and a beam splitter (2700) are also added. This beam splitter lets the light from the first laser (1000) through while the light from the second laser (1100) is reflected and reaches the second detector (3100). The signals from the two sets of lasers and detectors can be processed independently to obtain measurements in two different wavelength ranges.

The light source system (1000, 1100) comprises the laser and beam forming optics. The light source system will in this application be referred to as the "laser". The beam forming optics will be designed and adjusted so that the laser beam (4100) has a suitable divergence for an actual installation and optical path length.

In the illustrated example, a visible laser (1200) with a collimated beam is also added so that the operator of the instrument can see where the instrument currently is pointing.

Figure 3:
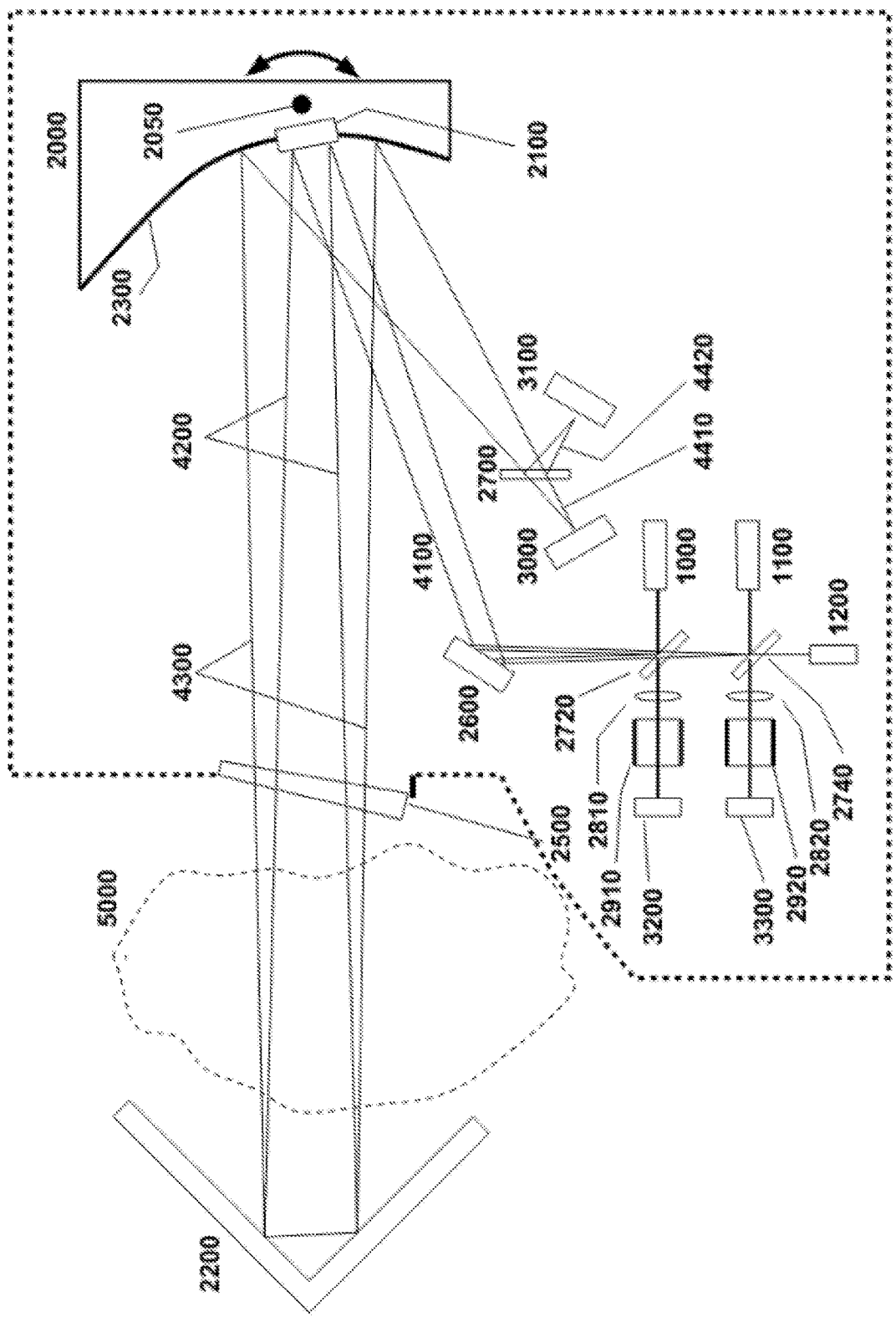
FIG. 3 is illustrating the addition of means to check the integrity of the instrument during normal operation.

FIG. 2 is illustrating the invention when a second laser (1100) is introduced together with beam splitters (2720) (2740) as well as a mirror (2700) and a second detector (3100). The optical design described in FIG. 1 is ideal when two or more lasers are present in one system like in FIG. 2 since both beams can be merged and go through the same optics and this optics can also be aligned internally and automatically inside the instrument housing. A visible laser for alignment (1200) can also be introduced making it possible to see where the instrument is pointing. This laser has a collimated beam while the tuneable ones have a divergent beam;

In another example, as illustrated in FIG. 3, the disclosure allows inclusion of verification means in the same optical design so that each laser can be checked continuously with regards to wavelength drift etc. Excess light from the beam splitters (2720)(2740) can be sent through gas cells (2910) (2920) and onto detectors (3200)(3300). The condition of the laser can be checked using the spectral properties of the gas in the cell.

FIG. 3 is illustrating the addition of means to check the integrity of the instrument during normal operation. This can be used to check that the laser wavelength is within the correct range or to check calibration using an internal optical path. In the figure there is one cell or module for each laser typically comprising different gases, or the same gas mix containing gas(es) with absorption lines in the wavelength ranges for both lasers. Excess light from the laser(s) is emitted through the beam splitter(s) (2720)(2740) and is focused by the lens(es) (2810)(2820), this light goes through the gas cell(s) (2910)(2920) and reaches the detector(s) (3200)(3300). In cases where the gas to be measured are not normally present, the target gas can be present in the cell thus making it possible to check that the laser still is operating in the correct wavelength range. A span check can also be done since calibration changes typically are due to changes in the laser output due to long time drift or change.

In some examples, said essentially flat mirror (2100) is not precisely flat, but instead has a curvature, in some examples to allow better focusing of the laser beam.

In some examples, said concave surface (2300) is not parabolical, but instead has another curvature.

In some examples, a plurality of detectors is utilized not by the use of beam splitters, but by using combined or sandwiched detectors that are sensitive to the different wavelengths, or in some examples by other means of spectral separation.

In some examples, a single detector is used and the different laser wavelengths are separated by the use of time-multiplexing or frequency-multiplexing techniques.

Some lasers are more sensitive to optical feedback than others. The basic design of this invention returns some of the light from the retro reflector to the small central mirror which in turn returns light to the light source system. This feedback can disturb the laser so that more optical noise is generated or in the worst case make the laser non-operational. This can be solved by inserting a shade or beam blocking plate (2210,2211) in the central part (2240) of the retro reflector (2200). The diameter of the shade can be adjusted to the optical path length and beam divergence. The diameter can be optimised for a certain range of optical path lengths for a given beam divergence and geometry of the collimating optics. Ideally the shade should block light from reaching the central mirror since this light will not contribute to the signal on the detector, but could disturb the laser.

Figure 4C:
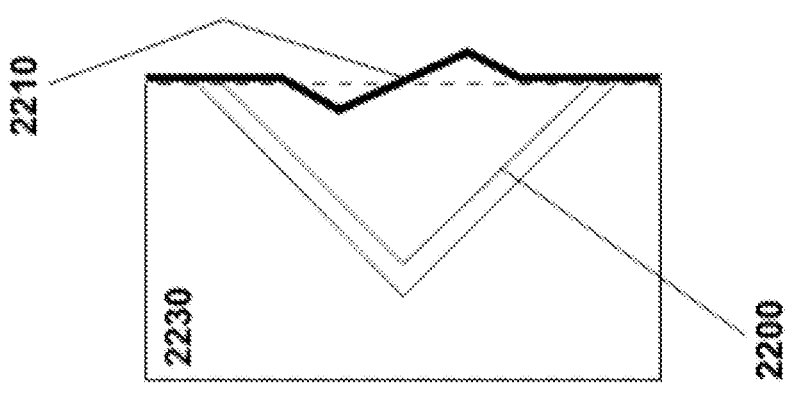
FIG. 4 *a, b* and *c* show a retro reflector (2200) mounted in a holder (2230) and with shades or beam blocking plates (2210, 2211).
Figure 4B:
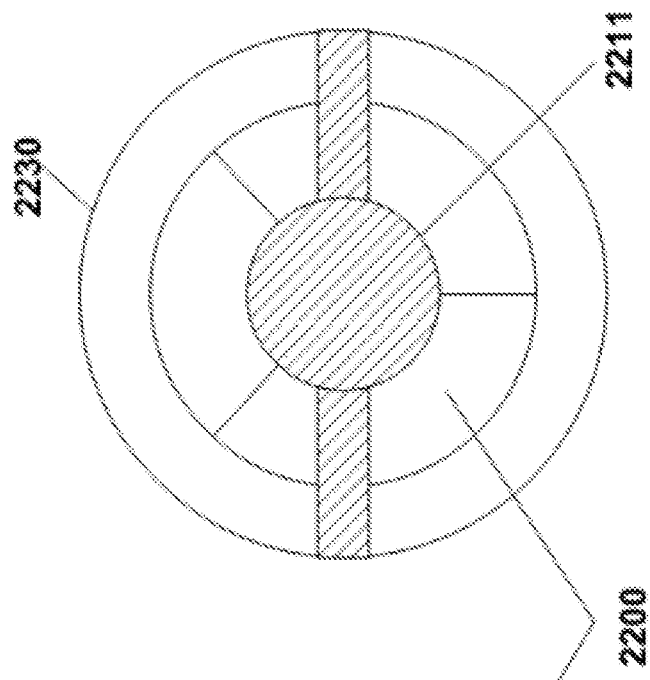
Figure 4A:
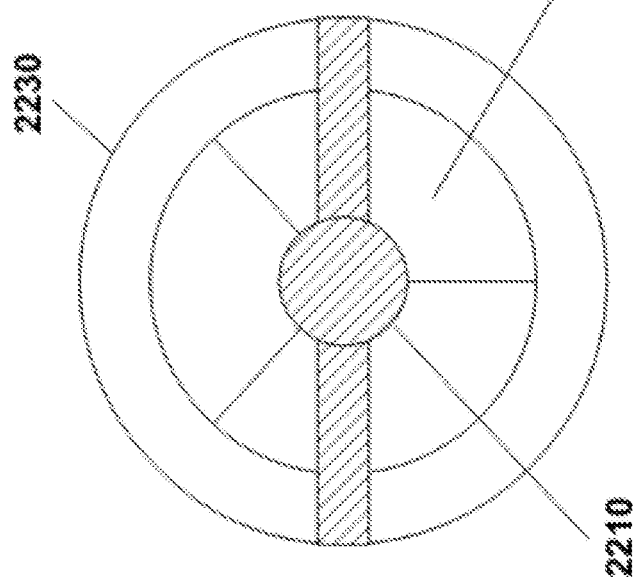

FIG. 4 a, b and c show a retro reflector (2200) mounted in a holder (2230) and with shades or beam blocking plates (2210, 2211). FIG. 4 b shows a somewhat larger shade (2211) than the shades (2210) shown in FIG. 4 a and c. As can be seen from FIG. 4 c the shade or beam blocking plate (2210) is tilted so that reflected light beams will be sent out of the optical path so that it will not reach the laser or end up on the detector.

Figure 8:
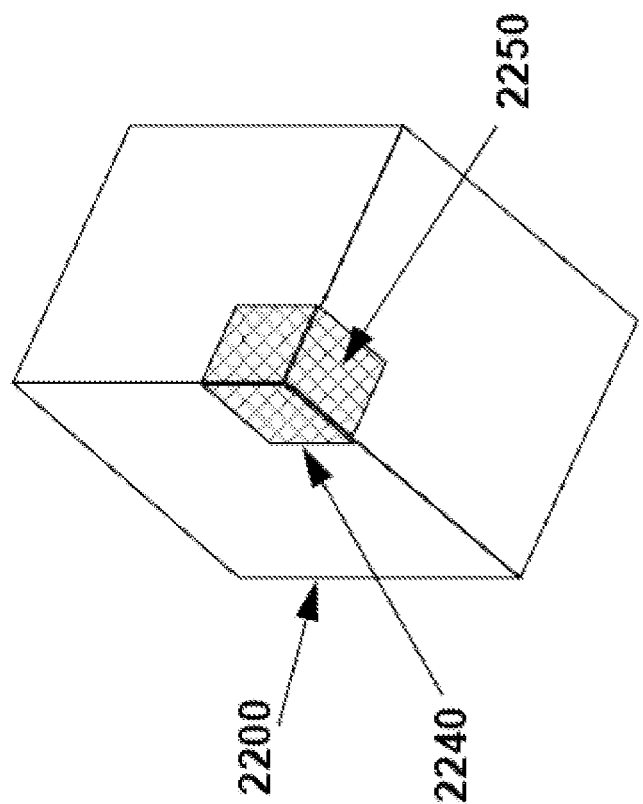
FIG. 8 shows a retroreflector (2200) where substantially the central part (2240) of the reflective surfaces of the retroreflector (2200) has been removed and replaced by a diffusor element (2250).

An additional embodiment for reducing light being reflected back to the light source (1000) is to remove the central part (2240) of the retroreflector (2200) when the retroreflector (2200) is being implemented as a cube corner of reflective surfaces. This gives easier maintenance than a beam blocking plate (2210) if cleaning of optical surfaces is required. An additional feature is to place a diffusor element in the central part (2240) of the retroreflector (2200) to reduce optical noise and to reduce reflections from surfaces behind the retroreflector (2210). This is shown in FIG. 8.

The dimensions of the central area (2240) where the reflective surface is being removed will be adapted to actual distances and dimensions of the different components to avoid reflections back to the light source (1000), but at the same time give the best possible measurement signal for the gas monitor.

One example of removing the central part (2240) of the retroreflector (2200) and at the same time creating a diffusor element is to sand blast or etch the central part of retroreflector (2200) to give a matte and diffuse surface.

Figure 5A:
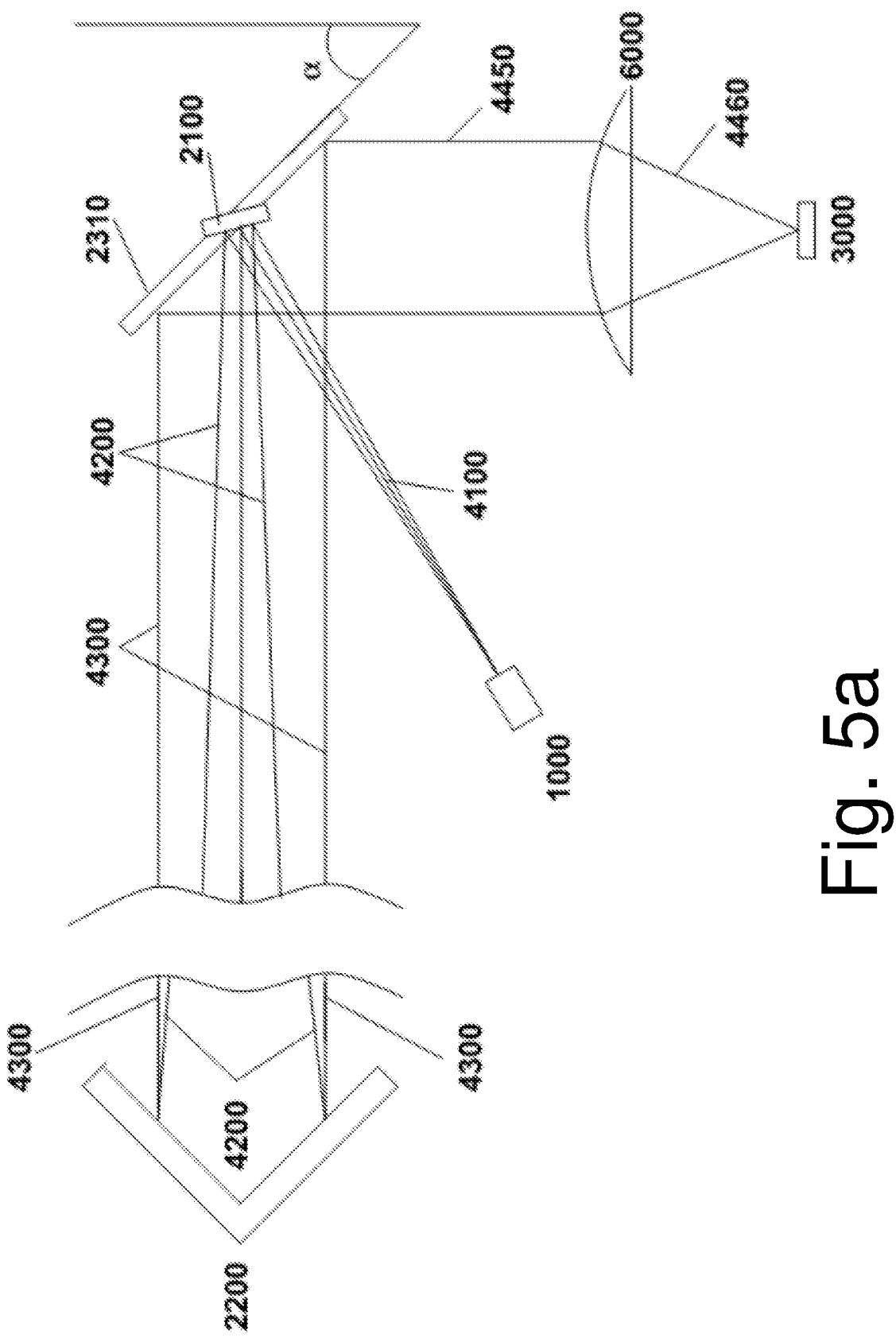
FIGS. 5*a* and 5*b* shows a mirror assembly consisting of two flat mirrors (2100 and 2310) which are used for beam steering.
Figure 5B:
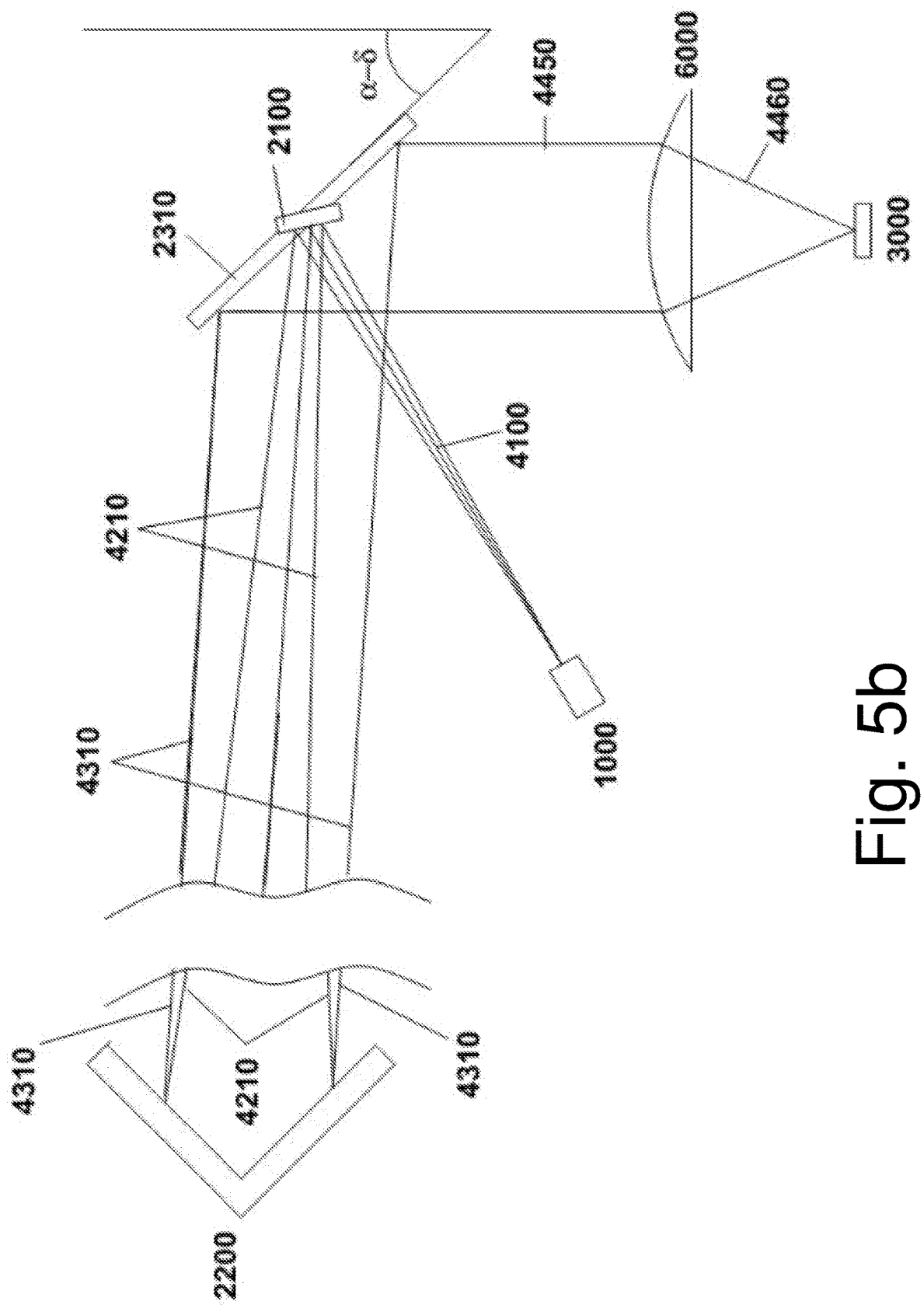

FIGS. 5a and 5b shows a mirror assembly consisting of two flat mirrors (2100 and 2310) which are used for beam steering. The central mirror (2100) directs the slightly divergent beam (4200 in FIGS. 5a and 4210 in FIG. 5b) from the laser (1000) to a cube corner (2200). The cube corner (2200) is in both figures in the center of the beam (4200 in FIGS. 5a and 4210 in FIG. 5b). The cube corner (2200) reflects the beam (4300 in FIGS. 5a and 4310 in FIG. 5b) back towards the mirror assembly. Due to a slight divergence, some part of the reflected beam (4300 in FIGS. 5a and 4310 in FIG. 5b) targets the large flat mirror (2310). The reflected beam (4450) is directed towards the focusing lens (6000) which focuses the beam (4460) onto a photodiode (3000). In FIG. 5a the mirror assembly is tilted with an angle $\alpha$. In FIG. 5B the mirror assembly is tilted with an angle $\alpha$-$\delta$. The direction of the reflected beam (4300 in FIG. 5a and 4310 in FIG. 5b) from the central mirror (2100) is changed with 2$\delta$ from FIG. 5a to FIG. 5b. The direction of the reflected beam (4300 in FIG. 5a and 4310 in FIG. 5b) from the cube corner (2200) onto the larger flat mirror (2310) is also changed with 2$\delta$ from FIG. 5a to FIG. 5b. Since the tilt angle of the large flat mirror (2310) is changed with -$\delta$ from FIG. 5a to FIG. 5b, the direction of the reflected beam (4450) from the large flat mirror (2310) will be unchanged from FIG. 5a to FIG. 5b. The focused beam (4460) from the lens (6000) will therefore target the same spot at the photodiode (3000).

An instrument according to the invention must be aligned so that the light beams travel from the laser (1000) to the central mirror (2100), from there through the window (2500), through the target gas (5000), then reaching the retro reflector (2200), then being reflected from the retro reflector back through the window to the surrounding mirror (2300) and finally being focused onto the detector (3000).

Adjusting the optical components so that the above is achieved will in this application be referred to as "alignment".

Alignment during manufacture of the instrument will typically be required for the lasers (1000, 1100), the beam splitters (2720, 2740), mirror (2600), beam splitter (2700) in the detector section as well as for the detectors (3000, 3100). Depending on the actual implementation of the mirror arrangement a lens arrangement in front of the detectors might additionally be needed. This lens arrangement might also need alignment.

Alignment in normal use by an end user will typically be done using a coarse alignment of the complete instrument and then only using the mirror assembly (2000) for the final fine adjustment. Alignment in normal use will be done with using adjustment screws (2060, 2070) as shown on FIG. 6.

FIG. 6 shows one possible implementation of the alignment system that can be used to align the gas monitor by changing the pointing direction of the mirror assembly (2000). FIG. 6 a) shows a cross section of the alignment mechanics. It is actually the cross section A-A of FIG. 6 b) which shows the mirror assembly from the mirror side. FIG. 6 c) shows the alignment system from one side. FIG. 6 d) shows the alignment system from the rear side. The mirror assembly (2000) moves around the steel ball (2050). The adjustment is done using push-screws (2060) and the movement in the other direction is arranged by having pull-screws which comprise a screw and a steel spring.

The alignment when the instrument is installed in the field could be done using manual alignment means or using automatic or semi-automatic means. A full manual system can be based on adjustment screws tilting or moving the mirror assembly (2000) around a "pivot" point (2050). One possible implementation is shown in FIG. 6.

FIG. 7 a shows the surrounding mirror surface (2300) and its optical axis (2350) without the hole for the central mirror. FIG. 7 b shows the central typically flat mirror (2100) and its optical axis (2150). FIG. 7 c shows the surrounding mirror (2300) with is central hole where the central typically flat mirror (2100) is placed. The optical axis' (2150, 2350) of both surfaces (2100, 2300) intersect in the same point which should be used as the pivot point for best performance of the system.

This intersection point is also preferably located at the surface of the central mirror (2100). Additionally the intersection point is the theoretical point where the optical axis of the surrounding mirror (2300) intersects the surface of the surrounding mirror (2300) if there had not been a hole in the centre of this mirror.

The optical axes (2150, 2350) of the central (2100) and the surrounding mirror (2300) intersect at an intersection point in the proximity (of the geometrical center) to the surface of the central mirror (2100). Preferably the distance between the intersection point and the surface is less than 10 mm, and more preferably the intersection point is located at the surface of the central mirror (2100). The mirror arrangement (2000)) can be tilted in any direction within a 3-dimensional solid angle around a pivot point (2050), where the pivot point (2050) is located in the proximity of the intersection point. The distance between the pivot point (2050) and the intersection point is preferably less than 20 mm, and more preferably the pivot point (2050) is located at the intersection point. Further, if the pivot and intersection point are not co-located, the pivot point (2050) is preferably located behind the surface of the central mirror (2100).

The mirror arrangement can be tilted as one integral unit relative to other parts of the gas monitor system, in any direction within a 3-dimensional solid angle, and thus providing alignment of the system by only tilting the mirror arrangement.

An automated or semi-automated alignment system will be based on actuators having similar functions as the adjustment screws except that no lock screws will be needed. Using at least one of the lasers and at least one of the detectors including electronics and digitising unit the actuators will be used to scan over the possible range to find the maximum signal intensity. One possible scan strategy will be to start in the centre and follow a spiral pattern outwards either a normal spiral or a square like spiral. Possible approaches are to stop at a sufficiently high local maximum or to scan across the whole range to find the global maximum. In a semi-automated mode the alignment procedure will be started by manual intervention while in the automated mode the alignment procedure will start when the signal intensity is below a certain threshold for a specified time. Many other more complex criteria for starting the alignment procedure are also possible.

Depending on implementation type the receiving optics will either be the curved or typically parabolic mirror (2300) which focuses the light onto the detector system. In case the surrounding mirror is flat (2310) the receiving optics will comprise a focusing lens (6000) as well.

An instrument according the present invention will acquire data which are a characteristic of the target gas. The instrument can also acquire data which are the characteristic of the gas or air present in the optical path inside the instrument and the gas or air in the optical paths outside the instrument, but not in the target gas. The complete instrument can be purged with nitrogen to avoid contribution from oxygen in the air inside the instrument.

The instrument can also acquire data from temperature, pressure, flow velocity and other sensors.

Based on the acquired data and predetermined knowledge and data the control unit will calculate the concentration of one or more gases and possibly the temperature (T) and/or pressure (p) based on spectroscopic data.

The Control unit comprises means to control the instrument i.e., temperature control, scan and modulate the laser, acquire data from the detectors and other inputs (T, p, etc.). The control unit will also do other required "housekeeping" tasks for the instrument. As already mentioned the control unit will calculate gas concentrations and other parameters. The control unit has and controls different input and output units (I/O) which are used to input other signals like T and p and to output results like the gas concentration(s). The control unit uses the I/O also for setup of the instrument as well as calibration and fault diagnosis.

In the current application the mirror assembly (2000) is also referred to as a mirror arrangement since the central and surrounding mirrors are arranged with a certain angle in-between. The mirror assembly has a pointing direction which can be defined with reference to either the optical axis of the surrounding or the central mirror or both. During alignment the pointing direction of the mirror assembly will be adjusted.

The optical axis of a flat mirror will be the normal of the mirror surface. The normal which coincides with the optical axis of other elements will be selected as the optical axis if applicable otherwise the normal in the centre of the flat mirror will be selected. In the current invention the term "retro reflector" will be used for all devices or surfaces, which reflects at least some light back to the instrument so that it can be detected by the detector system. A retro reflector can then be a cube corner, a reflective tape or any other device or surface capable of returning some light to the instrument. Even indoor or outdoor objects or surfaces might work as retro reflectors, walls, rock, the ground might be used.

The laser is arranged to that the light reaches the central mirror, the central and surrounding mirrors as well as the detector system are arranged so that the light reaching the central mirror is sent in the direction of a retro reflector and then sent back to the surrounding mirror and then to the detector system. Angles and positions can be arranged in correspondence with the examples given in FIG. 5.

The mirror assembly moves around the point or ball 2050. An arrangement where the mirror assembly slides on top of a curved surface with larger diameter can also be possible. This would probably lead to a larger distance between the surface of the central mirror and the point of movement and will lead to a smaller adjustment range.

An optional implementation of a dual laser system as shown in FIGS. 2 and 3 can be made using a central mirror with two reflective surfaces with an angle in-between. The first surface could be coated with a coating that reflects the 760 nm range while it transmits other wavelengths The next surface, possibly the rear surface having a different angle, will reflect all light. This arrangement could make it possible to have a laser and detector systems mounted differently from the examples shown in FIGS. 2 and 3. The laser and detector systems could then be more independently mounted, dependent only on the angles between the different surfaces of the central mirror.

One embodiment of the invention has a VCSEL laser (1100) around 760 nm, the beam entering a beam splitter (2740) reflecting typically 90% of the light from the laser and transmitting some visible light from the alignment laser (1200). The DFB laser (1000) around 2.3 micro meter emits light to the beam splitter (2720) which reflects around 90% of the light in the 2.3 micron range, this beam splitter also comprising a anti reflective coating for the 760 nm range so that the light from the first laser (1100) will be transmitted. The mirror (2600) directs the light in the direction of the central mirror (2100). Beam splitter (2720) also transmits some visible light for the alignment laser (1200).

Incoming light to the detector system will reach beam splitter (2700) which reflects light in the 760 nm range to the detector (3100). The same beam splitter has anti reflective coating optimised for the 2.3 micron region and the light originating from the laser (1000) will end up on the detector (3000).

It is possible to insert a cell containing the gas CO in a cell between beam splitter (2700) and detector (3000). This can be used for line tracking and span or verification check.

Gas cells (2910, 2920) can combined with detectors (3200, 3300) be used for line tracking and/or span or verification checks. All the mentioned cells can either be permanently mounted or inserted using an actuator system. Without cells the zero setting can be checked. The cells can be either flow through or sealed.

The current invention has the advantage that it allows more than one laser to be included in the same optical path thus also allowing one gas monitoring instrument to measure several gas components even though these gases have absorption lines so far apart that they cannot be scanned using one single laser. A group of embodiments comprising two different lasers operating in different wavelength ranges will be typical for the utilisation of this invention.

One example of this will be an instrument for combustion analysis comprising a first laser operating in the 760 nm region for measurement of oxygen (O2) and comprising a second laser in the 2327 nm region for measurement of carbon monoxide (CO). The laser operating in the 760 nm region could even scan more than one oxygen line enabling the measurement of the gas temperature using spectroscopic means. It could also scan across a close by NO2 line thus making it possible to measure O2, NO2 and temperature with the first laser. By selecting the wavelength range of the second laser so that it could scan a CO line, a methane (CH4) line and also two water vapour lines, the second laser could make it possible to measure three more gases with the same gas monitoring instrument as well as temperature using the two water absorption lines. It will then be possible to measure 6 components, 5 gases and temperature, in one instrument which needs only one hole in the stack or duct for in-situ operation.

In specific applications like a glass furnace where the temperature of the process is high and one wants to avoid connecting the analyser directly to the process ducts, temperature measurement using oxygen lines will not be applicable since the laser beam will go through both the process and the air between the analyser and the process duct. For such applications measuring temperature using the water vapour lines in the 2300 nm region could be used instead of the oxygen lines in the 760 nm region.

An instrument according to the current invention can accommodate a wide range of laser types some samples are, but are not limited to, VCSEL lasers, DFB lasers, QCL and ICL lasers, Fabry-Perot lasers, as well as different array types of lasers. These lasers could be operating in all wavelength ranges where lasers are available and where there are matching gas absorption lines. Any combinations of lasers and wavelength ranges are possible as long as the transmission through optical windows, lenses and beam splitter substrates are sufficient for operation.

The gas monitoring instrument of the current invention can be used in different configurations like, but not limited to, open path, cross stack using retro-reflector or in a one-flange solution using a probe with a built in retro-reflector. The one-flange probe solution could also comprise means to block particles from entering the optical path or beam. This could allow operation in environments where the dust-load is too high for operation of optical systems.

The invention claimed is:

1. A gas monitor system for determining at least one characteristic of a target gas, the gas monitor system comprising at least one light source, the light source being arranged for emitting light in a wavelength range wherein the target gas has at least one absorption line, the gas monitor system further comprising a retro reflector with reflective means, and a control unit, the gas monitor system being arranged for directing the light through the target gas to the retro reflector returning the light to a receiving optics, the gas monitor system further comprising a detector system with at least one light sensitive detector for detecting the light, the detector arranged for providing a signal to be received by the control unit, the control unit arranged for controlling the gas monitor system and calculating the at least one characteristic of the gas, wherein the gas monitor system comprises a mirror arrangement, the mirror arrangement comprising a central mirror and a surrounding mirror each with a surface, a geometrical center and an optical axis, wherein the central and the surrounding mirror are arranged with an offset angle between their optical axes, wherein the optical axes of the central and the surrounding mirror intersect at an intersection point in the proximity of the geometrical center of the surface of the central mirror, wherein the mirror arrangement can be tilted in any direction within a 3-dimensional solid angle around a pivot point, wherein the pivot point is located in the proximity of the intersection point, the central mirror being arranged for receiving light from the light source and directing light to the retro reflector, the retro reflector being arranged for returning the light to the surrounding mirror, the surrounding mirror being arranged for reflecting the light into the detector system.

2. The gas monitor system according to claim 1, wherein the intersection point of the optical axes is located less than 10 mm from the geometrical center of the surface of the central mirror.

3. The gas monitor system according to claim 1, wherein the pivot point is located less than 20 mm from the intersection point of the optical axes.

4. The gas monitor system according to claim 1, wherein the intersection point of the optical axes and the pivot point are located at the geometrical center of the surface of the central mirror.

5. The gas monitor system according to claim 1, wherein the gas monitor system is arranged for forming beams, each beam having an axis, beam from a light source system comprising the light source to central mirror, beam from central mirror to retro reflector, beam from retro reflector to surrounding mirror and beam from surrounding mirror to detector system, and wherein the gas monitor system is arranged for the beams to and from the retro reflector to be substantially co-axial, and the axes of the beams to the central mirror from the light source system and from the surrounding mirror to the detector system to be non-coincident.

6. The gas monitor system according to claim 5, wherein the gas monitor system is arranged such that twice the angle between the optical axis of the central mirror and the surrounding mirror substantially corresponds to the angle between the optical axis of the light source system and the detector system.

7. The gas monitor system according to claim 1, wherein the central mirror and surrounding mirror each comprises a surface for reflecting light, and the mirror arrangement is arranged such that the surface of the surrounding mirror surrounds the surface of the central mirror.

8. The gas monitor system according to claim 7, wherein the surfaces of the central and surrounding mirror are further arranged such that the intersection point of the optical axis is located in the optical center of the central mirror.

9. The gas monitor system according to claim 1, wherein the central mirror is one of the following forms: flat, parabolic, off-axis parabolic, and spherical, and the surrounding mirror is one of the following forms: flat, parabolic, off-axis parabolic, and spherical.

10. The gas monitor system according to claim 1, wherein the detector system is located outside the beams between the mirror arrangement and the retro reflector.

11. The gas monitor system according to claim 1, wherein the light source is a laser of one of the following:
VCSEL lasers;
DFB lasers;
QCL and ICL lasers;
Fabry-Perot lasers; and
array of lasers.

12. The gas monitor system according to claim 1, wherein the retro reflector is one of the following: cube corner, or a reflective tape.

13. The gas monitor system according to claim 1, wherein the mirror arrangement is arranged for pointing the beam from the central mirror in a pointing direction mainly towards the retro reflector, and wherein the gas monitor system comprises alignment means for adjusting the pointing direction of the mirror arrangement.

14. The gas monitor system according to claim 13, wherein the alignment means are arranged for providing the tilting of the mirror arrangement mainly around the pivot point.

15. The gas monitor system according to claim 13, wherein the pivot point is located in the proximity of the geometrical center of the central mirror.

16. The gas monitor system according to claim 13, wherein the pivot point is located behind the geometrical center of the central mirror in the proximity of the optical axis of the central mirror.

17. The gas monitor system according to claim 13, wherein the alignment means comprises means for automatically aligning said mirror assembly towards the retro reflector by moving said mirror assembly while monitoring a signal, and finding an optimal signal.

18. The gas monitor system according to claim 1, wherein the gas monitor system comprises a visible light source arranged for sending a collimated beam of visible light substantially co-axially with the beam from the at least one light source to facilitate alignment of the gas monitor system.

19. The gas monitor system according to claim 1, wherein the gas monitor system comprises a plurality of light sources operating at different wavelengths, each light source having a beam splitter for merging the light beams from the light sources to a common path; said beam splitters having spectral properties for the light from the light sources corresponding to each beam splitter to be reflected, while light at wavelengths from other light sources is transmitted.

20. The gas monitor system according to claim 1, comprising a plurality of light sensitive detectors and a plurality of beam splitters for separating the wavelengths from each light source to individual detectors.

21. The gas monitor system according to claim 19, wherein the gas monitor system is arranged for time-multiplexing or a frequency-multiplexing to separate the wavelengths from each light source.

22. The gas monitor system according to claim 19, wherein the gas monitor system is arranged to let excess light from the beam splitters pass through at least one gas cell for each of the light sources and then onto at least one additional light sensitive detector for each of said light sources; said at least one gas cell containing gas with absorption properties that are suited to be used for self-calibration and to monitor the instrument integrity with regards to spectral operation points.

23. The gas monitor system according to claim 1, wherein the retro reflector comprises a beam blocking plate arranged substantially symmetrically around a center axis of the retro reflector for blocking light from being reflected by the retro reflector via the central mirror back to the light source.

24. The gas monitor system according to claim 23, wherein the blocking plate is substantially formed like a circular disc with a diameter optimized for a range of optical path length and beam divergence.

25. The gas monitor system according to claim 23, wherein the blocking plate is arranged in an angle tilted relative to the optical axis of the retro reflector.

26. The gas monitor system according to claim 1, wherein the retro reflector comprises a central part, the reflective means having been removed to avoid laser light being reflected back via the central mirror to the light source.

27. The gas monitor system according to claim 26, wherein a diffuser element is placed in the central part of the retroreflector where the reflective means have been removed, the diffuser element reducing optical noise and reflections from surfaces behind the retroreflector.

28. The gas monitor system according to claim 27, the reflective means of the central part comprising a reflective surface being sand blasted or etched for substantially removing the reflective surface and making the diffuser element.

* * * * *